United States Patent [19]

Tirelli et al.

[11] Patent Number: 4,715,917

[45] Date of Patent: Dec. 29, 1987

[54] PROCESS FOR THE PRODUCTION OF A MULTIDETECTOR WITH IONIZATION CHAMBERS

[75] Inventors: Marco Tirelli, Palaiseau; René Lecolant, Etampes; Raoul Hecquet, Boulogne, all of France

[73] Assignee: Thomson-CGR, Paris, France

[21] Appl. No.: 807,732

[22] Filed: Dec. 11, 1985

[30] Foreign Application Priority Data

Dec. 14, 1984 [FR] France ................................ 84 19188

[51] Int. Cl.$^4$ ................................................ B32B 31/18

[52] U.S. Cl. .................................... 156/250; 156/257; 156/268; 156/307.1; 156/307.3; 156/307.7; 250/385 R; 250/385 SC

[58] Field of Search ............... 156/250, 257, 268, 293, 156/305, 307.1, 307.3, 307.7; 250/382, 385 R, 385 SC

[56] References Cited

U.S. PATENT DOCUMENTS

| | | | |
|---|---|---|---|
| 4,283,817 | 8/1981 | Cotic | 156/293 |
| 4,345,155 | 8/1982 | Allemand et al. | 250/385 |
| 4,345,156 | 8/1982 | Ishikawa et al. | 250/385 |
| 4,476,390 | 10/1984 | Hanawa | 250/385 |
| 4,481,420 | 11/1984 | Allemand et al. | 250/385 |

FOREIGN PATENT DOCUMENTS

| | | | |
|---|---|---|---|
| 0046125 | 2/1982 | European Pat. Off. . | |
| 3248184 | 5/1984 | Fed. Rep. of Germany . | |
| 103378 | 8/1981 | Japan | 250/385 |

OTHER PUBLICATIONS

Patents Abstracts of Japan, vol. 8, No. 163, (P-290), (1600), Jul. 27, 1984; & JP-Ap-59 58 379 (Shimazu Seisakusho K.K.), 04-04-1984.

*Primary Examiner*—Caleb Weston
*Attorney, Agent, or Firm*—Oblon, Fisher, Spivak, McClelland & Maier

[57] ABSTRACT

The invention relates to a process for the production of a multidetector with ionization chambers and to the multidetector obtained by this process. The partitions of the ionization chambers of the multidetector are maintained with respect to one another and transported together by means of a tool above a bath of resin to be polymerized. Following the hardening of the resin, the detector has resin bases. For containing the resin bath, the invention provides for the production of a mould cut in a solid resin block, which permits handling throughout the process without any risk of deterioration.

10 Claims, 11 Drawing Figures

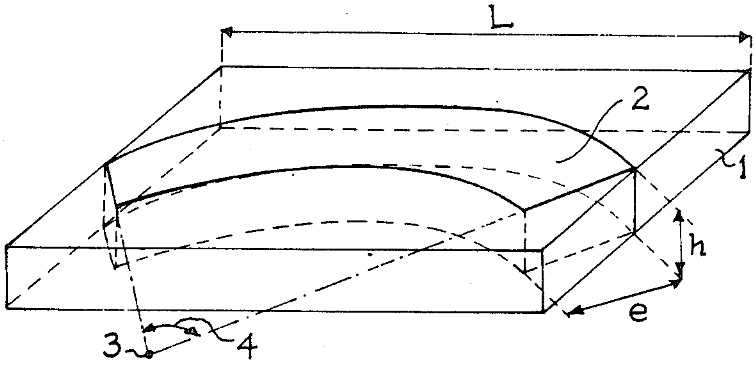
Fig.1
Fig.2b
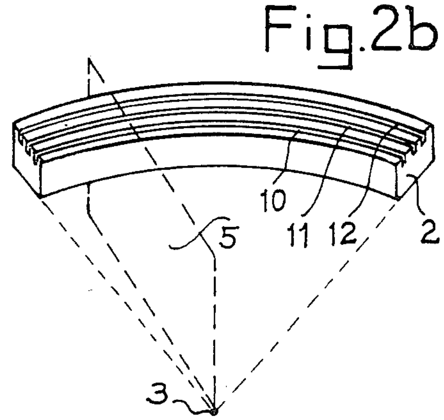
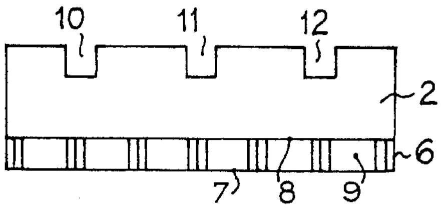
Fig.2a
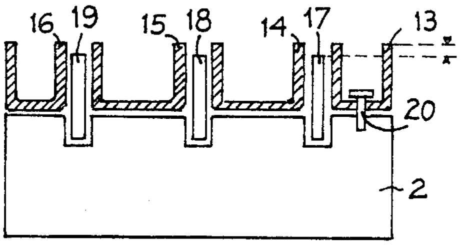
Fig.3a
Fig.3b
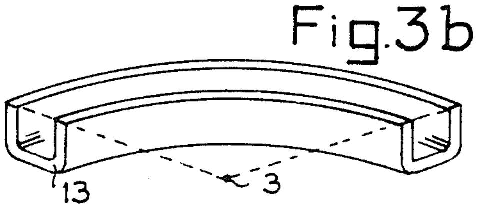
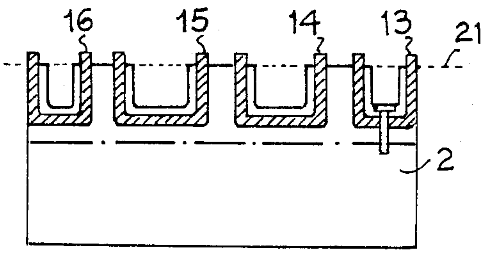
Fig.4
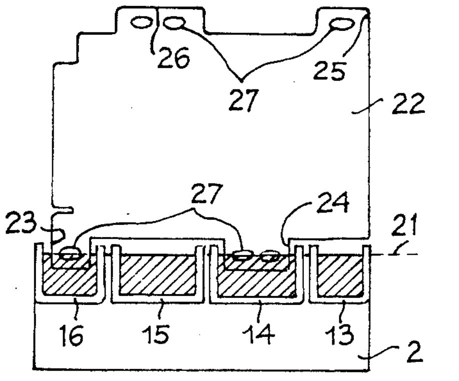
Fig.5

PROCESS FOR THE PRODUCTION OF A MULTIDETECTOR WITH IONIZATION CHAMBERS

BACKGROUND OF THE INVENTION

1. Field of the Invention

The present invention relates to a process for the production of a multidetector and also relates to the multidetector obtained by this process.

The multidetectors in question are essentially multidetectors with ionization chambers. They are of the type used in X-ray tomoscanners. A multidetector with ionization chambers has a plurality of adjacent chambers, which are separated from one another by metallized partitions forming an electrode: alternatively an anode or cathode. All these chambers are filled with an ionizable gas (e.g. xenon). When the gas contained in a chamber is excited by X-radiation, it is ionized and consequently gives rise to an ionization current between the electrodes on either side of said chamber. The intensity of the ionization current reveals the intensity of the exciting X-radiation. On knowing the intensity of an emitted X-radiation, it is possible to deduce therefrom the radiological absorption density of a zone of a medium traversed by part of the radiation. For this purpose, after traversing said medium, the intensity of said radiation part is measured when it arrives at a chamber level with said zone. The adjacent arrangements of the multidetector chambers make it possible to draw up a cartography of the radiological absorption densities of the adjacent zones of the examined medium.

On of the most important factors of the ionization current intensity is the width of a chamber, the distance separating the two electrodes or partitions of said chamber. In order to render homogeneous the ionization current measurements in all the chambers, it is appropriate to produce said chambers with equal widths.

To this end, use is made of ceramic supports, in which adjacent grooves or slots are produced by sawing. The partitions are then slide one by one into said slots for defining the chambers. This process suffers from a disadvantage, namely that in order to be able to slide the partitions/electrodes into the slots, the latter must be sufficiently overdimensioned with respect to the thicknesses of said partitions. This necessary overdimensioning is prejudicial to the accuracy of the fitting of the partitions.

2. Description of the Prior Art

In the present state of the art, tomoscanners are provided with a multidetector having approximately 1000 ionization chambers. When distributed over approximately 1 meter and once the thickness of the partitions has been deduced, the width of the chambers is approximately 0.5 mm. If it is wished to obtain a good homogenereity of the width of the chambers, it is advantageous if said width does not vary by more or less than 10%. Therefore the sawing of the slots must take place with an accuracy equal to or greater than 5% of the width of a chamber (twice 5% = 10%, because there are two partitions per chamber). This leads to machining tolerances of approximately 20 microns, which require costly equipment.

Moreover, it is not possible to produce ceramic supports with a large size. Generally in order to obtain a multidetector with a length of approximately one meter, it is necessary to align end to end 3 segments of approximately 300 mm each. The installation of these segments is difficult, in view of the fact that the organization system of the chambers continues, even on passing from one segment to another. Therefore the assembly tolerance of the individual segments must have the same accuracy of that required for the machining of the slots. It is standard practice for operators to use a magnifying glass to adjust said assembly of segments. It is also impossible to bond the ends of said segments to one another. Thus, bonding exerts forces on the bonded pieces, so that it is not possible to control the spacing of the thus approached pieces. The production of the partition supports is further complicated by the fact that it is necessary to provide guard rings. The latter, which are metal strips arranged orthogonally to the partitions in the support, are used for intercepting parasitic ionization currents. In the present state of the art, each segment of the support is itself formed from four elongated elements, which are joined to one another. Prior to the joining of these four elements, there backs are covered with a coating of silver varnish, which acts as a conductive electrode and serves as the guard ring. Machining of the slots is only carried out on a segment after the four elements forming it have been joined by bonding. It is pointed out that this difficult slotting operation must be carried out the same number of times as there are multidetectors to be constructed.

SUMMARY OF THE INVENTION

The object of the present invention is to obviate the aforementioned difficulties by eliminating the slotting operation in connection with the production of multidetectors. The fitting of the partitions/electrodes in the present invention is carried out once and for all by means of a special tool maintaining all the electrodes at the same time. The flanges of the partitions bristle over one face of said tool. These flanges are then immersed at the same time in a polymerization-hardenable resin bath. As soon as the resin has hardened, the tool is removed and the partitions are maintained with respect to one another. The precision of the clearance between adjacent partitions is then determined by the structure of the tool used. In this solution the tool is reusable and consequently there is no need to recommence the difficult slotting operation. An operation of the same order of precision is carried out once and for all, namely that used for producing the tool.

The hardenable resin bath must be contained in a mould. However, it has been found that at the time of mould removal, the resin coating maintaining the flanges of the partition breaks. Thus, this partition support has a large size, but is not very thick and is consequently fragile. Moreover, the differential forces withstood by the resin on the one hand and by the mould on the other during the thermal-initiated polymerization process of the resin do not make it possible to produce supports in one piece. This problem is solved in the invention by replacing the mould by a base made from epoxy resin or some other similar material (e.g. a composite material). The base is then cut in a larger epoxy resin block. The mould then forms an integral part of the support.

The present invention therefore specifically relates to a process for the production of a multidetector with ionization chambers provided with metallized partitions, wherein it comprises the following stages:

a base with the same shape as the multidetector to be produced is cut from a resin monoblock, all the partitions are placed in a tool of a generally adequate shape, in such a way that the flanges of these partitions emerge therefrom, the resin to be polymerized is spread over the base, the tool is moved up to the base and is maintained there throughout the polymerization of the resin, so that the partitions immersed in the resin are welded to the base.

The invention also relates to a multidetector with ionization chambers provided with metallized partitions, wherein it has at least one resin base, to which the partitions are welded by the resin.

BRIEF DESCRIPTION OF THE DRAWINGS

The invention is described in greater detail hereinafter relative to a non-limitative embodiment and with reference to the attached drawings, where the same references designate the same elements throughout and wherein show:

FIGS. 1, 2*a*, 2*b*, 3*a*, 3*b* and 4, 5, 6 and 7 the stages of the production process according to the invention.

DESCRIPTION OF THE PREFERRED EMBODIMENT OF THE INVENTION

Figure 6:
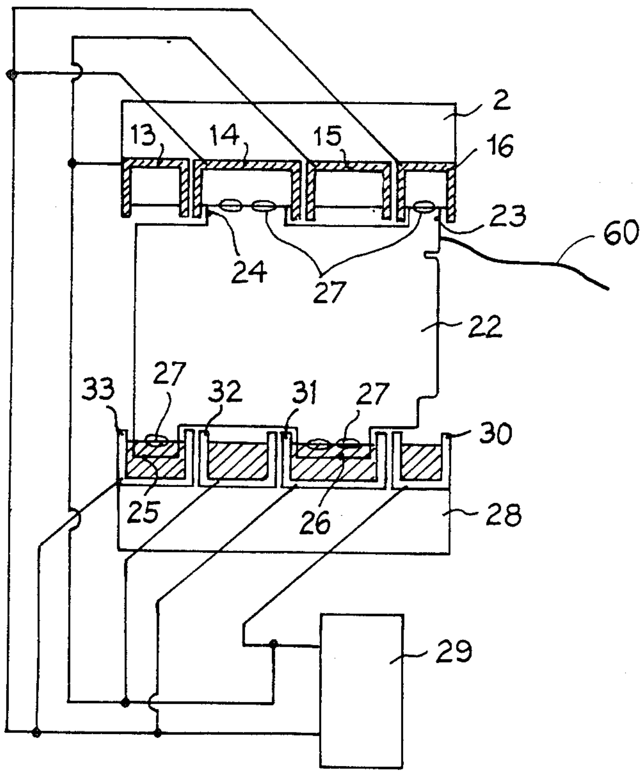

FIG. 1 shows a block 1 of an epoxy resin, which is free from air bubbles because it is based on a resin polymerized under pressure. In a preferred manner according to the invention, the quality of the resin is chosen with a damping or attenuation coefficient favourable for microphonics. The block 1 is sufficiently large to permit the cutting therein of a base 2 of width e, thickness h and length l. In a preferred manner, the thickness of block 1 is equal to h. The cutting is carried out in preferred manner by milling. This means that the base 2 is not subject to any mechanical stressing and means that bases of all desired shapes can be obtained. In particular, base 2 is shaped like a ring portion centered on centre 3. in an example where the multidetector to be produced is to be used in a medical tomoscanner, the aperture angle 4 of the ring portion is essentially 41° 40. In this example, the length l is 1 meter, the thickness h 5 to 10 mm and the width is 50 mm. In this application, a point X-ray source is located at centre 3. This source emits a fan-like beam with angular aperture essentially equal to angle 4. The source and multidetector are to be installed on a third generation tomoscanner, namely a rotation tomoscanner.

FIGS. 2 to 4 show a preferred manner of obtaining guard rings. FIG. 2*a* is a section along the radial plane 5 of base 2 shown in perspective in FIG. 2*b*. FIG. 2*a* shows base 2 provided at its bottom with a layer 6 representing a reinforcement for reinforcing the mechanical strength of said base. In this example, the reinforcement 6 has two epoxy resin sheets 7 and 8 enclosing a honeycomb structure 9, which is shown in sectional form. It can also be made from epoxy resin. The honeycomb structure is orientated perpendicular to sheets 7 and 8 and perfectly withstands the extensional stresses imposed by base 2. This is further improved if structure 9 is also of resin. Reinforcement 6 can be eliminated by choosing for block 1, e.g. a glassfibre-filled resin. There are three longitudinal slots 10 to 12 in base 2 and they are e.g. spaced by approximately 16 mm, whilst there depth is approximately 1 mm. The constructional tolerance with regards to the slots is not very demanding.

Slots 10 to 12 can be used for guard rings, as shown in FIG. 3. FIG. 3*b* shows a guard ring 13 in the form of curved channel adopting the general shape of the detector. The depth of these channels is e.g. 8 mm. FIG. 3*a* is a section along plane 5 of base 2 once the guard rings 13 to 16 have been fitted there. The guard rings are separated from one another by epoxy resin insulating bands 17 to 19. The latter have a thickness slightly smaller than the width of slots 10 to 12. They are easily engaged there. In the preferred realization where the guard rings are in the form of channels, the heads of said channels rise above the upper edges of the resin bands placed edgewise in the slots. In an example, this height difference is approximately 1 mm, its justification being provided hereinafter. In a preferred manner, the channels are made from cold-hardened copper (e.g. of thickness 0.3 mm), which gives them a certain rigidity useful during fitting. To ensure that these channels do not slide above base 2, they can be fixed to it by pins 20, which are regularly spaced all along the channel. the manufacturing tolerance of the channels is of the same order as that involved for the production of slots 10 to 12. It makes is possible to produce channels by the pressing of copper sheets.

The guard rings can e.g. be coated for forming the multidetector base. At this stage of the process there are two possible solutions. A layer of the resin to be polymerized can be deposited on the walls of the channels and namely inside and outside the same. Alternatively the channels are coated by embedding them in the resin to be polymerized. In both cases the resin is polymerized before passing on to the following stage. In the second solution, which is preferred, the resin is re-cut by milling within the channels. FIG. 4 summarizes these operations. It is possible to see base 2, as well as the reminder in dot-lines of the previous upper level of said base. The polymerized resin is now level with the level 21. This level, which is also called the table, is lower than the tops of the channels by approximately 0.5 mm. It is also possible to see in dotted line form within each channel, the height up to which the resin was applied prior to the preferred re-cutting operation.

By means of a tool, to be discussed hereinafter, all the electrodes are moved simultaneously towards the thus prepared base. FIG. 5 shows in a plane such as 5, a partition 22 moved above base 2. The partitions 22 are provided with flanges or tags, such as 23 to 26; these tags are located on two opposite edges of the partitions. Only the tags 23, 24 located on one and the same edge are moved towards base two. The tabs are provided at mid-height with holes such as 27. Once these tabs (in this case 23 and 24) have been introduced into the channels (in this case 14 and 16) of the base, or optionally beforehand, a not yet polymerized resin is poured up to a height passing essentially between the centre and the upper edges of the holes 27 in the tabs and the table level 21. The electrode 22 is an electrode having a given polarity, e.g. an anode. The two electrodes adjacent to this electrode and which form with it two adjacent ionization chambers have reversed polarity, e.g. cathodes. They are not shown, but one is located in a deeper plane and the other is located in plane closer to the observer of the drawing and also have two tabs. the latter serve to respectively engage in channels 13 and 15. As all the electrodes are fitted at the same time, it is always of interest to pour not yet polymerized resin simultaneously into all the channels. the cathode tabs also have holes such as 27. The purpose of these holes is to a system of communicating vessels above the resin layer during polymerization. In this way it is possible to prevent the rising of the resin by capillarity along partitions. This resin to be polymerized fills the channels, as is again indicated by lines in FIG. 5 and is again level with the aforementioned reference level 21. It is important for level 21 to be below the top of the channels forming the guard rings. Thus, the leakage currents which propagate in the resin are essentially surface currents. It is therefore important not to link resins in contact with partitions/anodes with resins in contact with the partitions/cathodes. It is for this reason that in a preferred embodiment of the invention, the guard rings are in the form of channels, whose heads emerge above level 21.

Once the operations have been performed, they are carried out again for producing another base adhering to the flanges of the opposite side of the partitions. In FIG. 6, a second base 28, which is in all points comparable with base 2 is moved beneath the multidetector, so that the other flanges are bonded thereto. In can be seen that the base 2 is already fixed to the multidetector. FIG. 6 also shows a high voltage supply device for the channels forming guide rings. A generator 29 supplies channels 13, 16 and 30 to 33 with voltages close to the anode or cathode bias voltage supplied to each of the partitions 22 by its connections 60. In FIG. 6, tabs 23 to 26 of partition 22 are immersed in the resin contained in channels respectively 16, 14, 33 and 31. All these channels are kept at the same potential and are all connected to a single terminal of the generator 29. The same applies regarding channels 15, 13, 32 and 30, which are connected together to another terminal of generator 29, because the resin contained therein maintains the partitions at a polarity which is the opposite to that of partition 22.

Although the construction of the guard rings in the form of metal bands only embedded in the bottom of bases 2 or 28 is adequate for detecting volume leakage currents in the resin, the arrangement according to which the tops of the channels effect a division of the resin surface is appropriate for detecting the surface leakage currents. It is remarkable that this projection of the tops of the channels cannot be envisaged in a prior art process described where slotting takes place after providing silver varnish coatings. Obviously this slotting penetrates the silver varnish coatings at the location of the slots, so that it does not make it possible to eliminate the surface leakage currents. In the method referred to hereinbefore, the tops of the channels were located below the bottom of the partition tabs so that they could slide in the slots. Thus, these tops where below level 21 up to which had been spread the resin for gripping the partitions. It is pointed out that the operations consisting of fitting the channels, coating them with resin and then welding or sealing there with resin the flanges of the electrodes are successful because the channels are maintained in a base accepting the same expansion as they do, i.e. the resin base according to the invention. The actual channels do not lead to differenital stresses. They are slender and are also fixed by pins to the base, which move them in there own deformations.

Figure 7:
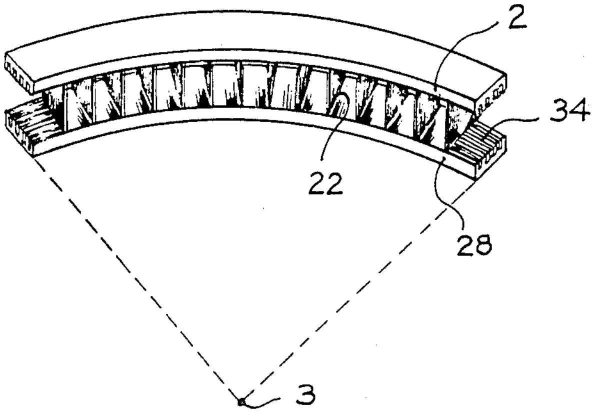

FIG. 7 relates to the device to which the production process according to the invention leads. This device is a multidetector having partitions such as 22 which are joined and maintained with respect to one another by two bases 2, 28 essentially made from epoxy resin. it is also possible to see in the right-hand lower part, tops such as 34 of the channels emerging from the resin.

Figures 8, 9:
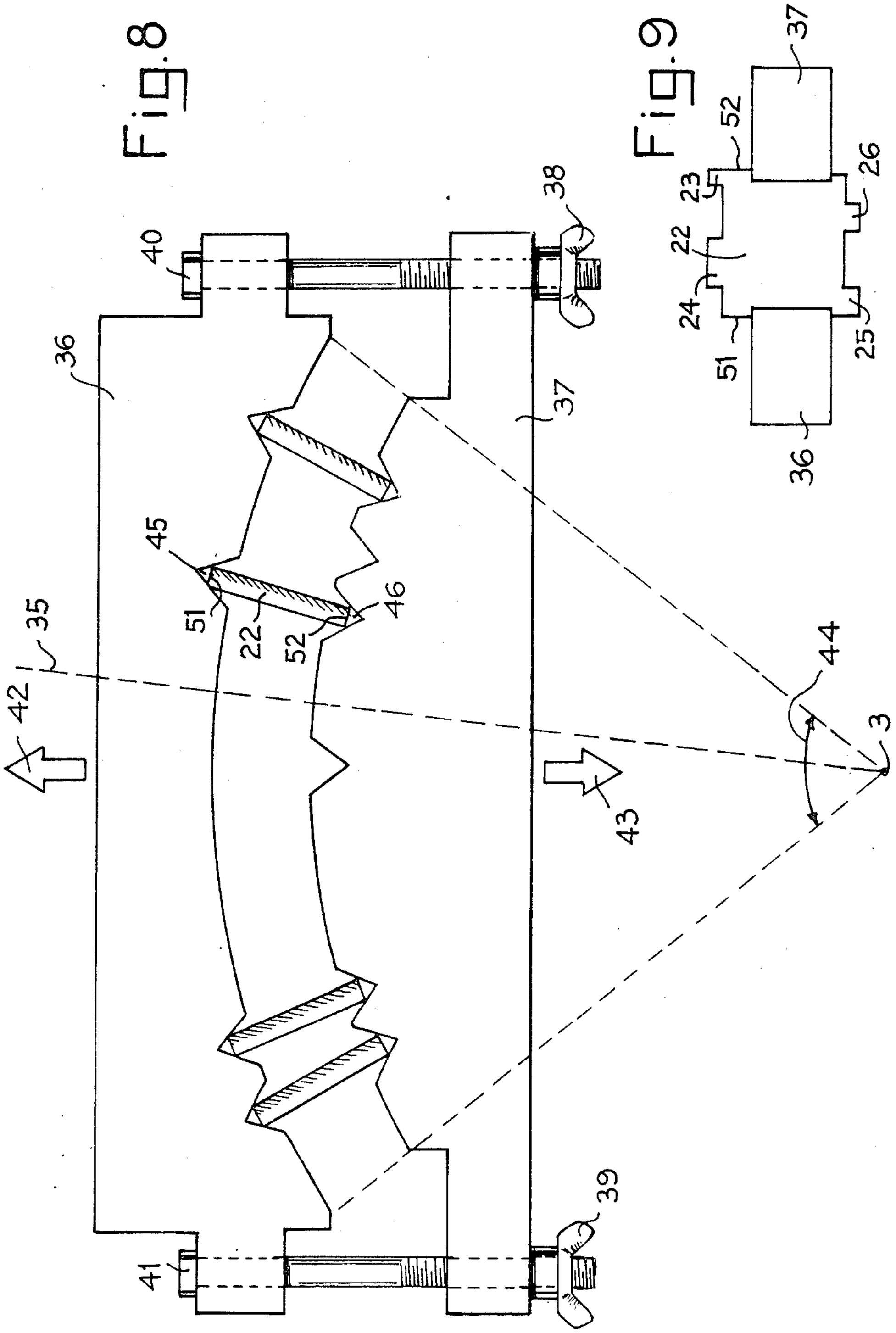
FIGS. 8 and 9 A diagrammatic view of a tool for performing the invention.

FIG. 8 shows an example of the tool used for securing the partitions before there flanges are immersed in the resin to be polymerized contained in the channels. FIG. 9 shows in section in a radial direction such as 35, that the tool has two jaws 36, 37, which enclose the partitions. It can be seen that the flanges of the partitions project beyond the plane of the tool. The two jaws are mobile and can be moved together by any known means, e.g. by screwing two threaded wing nuts 38, 39 around bolts 40, 41, which are used for assembling the two jaws. The two bolts are parallel to one another. They impose a collinear displacement of the two jaws, indicated by arrows 42, 43 in FIG. 8. FIG. 8 shows a tool used for the production of a curved multidetector. The angle in the centre 44 of said multidetector is e.g. 41° 40. The tool can be perfectly adapted to the production of a straight multidetector. For holding the partitions 22, each jaw 36, 37 is provided with notches 45, 46 respectively. On exerting an action tending to move together the two jaws, edges 51, 52 respectively of each partition engage against the bottoms of the slots.

What is claimed is:

1. A process for the production of a multidetector having ionization chambers and metallized partitions wherein each of said metallized partitions has a plurality of flanges, comprising the steps of:
   - cutting, in a resin monoblock, a base having the same shape as the multidetector to be produced;
   - arrranging said partitions in a tool shaped so that said flanges of said partitions extend from said tool;
   - spreading onto said base a resin which is to be polymerized;
   - moving said tool close to said base;
   - polymerizing said resin while maintaining said tool close to said base so that said partitions which are immersed in said resin are welded to said base.

2. A process according to claim 1, further comprising the step of cutting said base into a ring portion.

3. A process according to one of claims 1 or 2 wherein said steps are repeated for welding each of said flanges of said partitions to a second base.

4. A process according to any one of claims 1 or 2, comprising the steps of forming holes, prior to arranging said partitions in said tool, in the flanges of said partitions.

5. A process according to one of claims 1 or 2, comprising, prior to said step of arranging, the further step of preparing metallized bands which are each cut out and which are adjacent to each other and which are of the same shape as said base wherein said cut bands serve as a guard ring;
   - deposing said adjacent bands on said base; and
   - coating said bands with epoxy resin by polymerization.

6. A process according to claim 5, wherein the step of coating said bands includes the steps of embedding said bands in said resin to be polymerized and re-cutting said resin after polymerization.

7. A process wherein claim 5 wherein the step of coating said bands includes the step of depositing on the walls of the bands a coating of said resin to be polymerized.

8. A process according to claim 5 further comprising the step of fixing said bands to said base before coating said bands.

9. The process according to claim 5 comprising the further steps of shaping said bands into the shape of a channel and wherein the step of coating said bands is limited to the lower part of said channel shaped bands in such a way that the tops of said channel shaped bands are not coated.

10. A process according to claim 5 comprising the further steps, prior to the steps of coating, of:

forming slots in the base parallel to said bands and placing already polymerized resin sheets edge wise in said slots.

* * * * *